(12) United States Patent
Pearce et al.

(10) Patent No.: US 9,063,249 B2
(45) Date of Patent: Jun. 23, 2015

(54) SYSTEM FOR MEASURING A TIME OFFSET AND METHOD OF MEASURING A TIME OFFSET

(75) Inventors: Christopher Pearce, Hook (GB); Shaun Dunn, West Stafford (GB)

(73) Assignee: Sonardyne International Limited, Blackbushe Business Park, Yateley (GB)

( * ) Notice: Subject to any disclaimer, the term of this patent is extended or adjusted under 35 U.S.C. 154(b) by 617 days.

(21) Appl. No.: 13/473,944

(22) Filed: May 17, 2012

(65) Prior Publication Data

US 2012/0294112 A1 Nov. 22, 2012

(30) Foreign Application Priority Data

May 17, 2011 (GB) .................................. 1108222.9

(51) Int. Cl.
*H04B 11/00* (2006.01)
*G01V 1/38* (2006.01)
*H04B 13/02* (2006.01)

(52) U.S. Cl.
CPC ................ *G01V 1/38* (2013.01); *G01V 1/3861* (2013.01); *H04B 13/02* (2013.01)

(58) Field of Classification Search
CPC ......... G01V 1/38; G01V 1/3861; H04B 13/02
USPC ........................................ 367/2, 14, 21, 131
See application file for complete search history.

(56) References Cited

U.S. PATENT DOCUMENTS

| 6,459,654 | B1 | 10/2002 | Bary et al. | |
|---|---|---|---|---|
| 8,279,710 | B2 * | 10/2012 | Rhodes et al. | 367/134 |
| 2008/0304361 | A1 | 12/2008 | Peng et al. | |
| 2010/0278014 | A1 * | 11/2010 | Rhodes et al. | 367/134 |
| 2012/0287753 | A1 * | 11/2012 | Hatchell et al. | 367/21 |
| 2013/0135968 | A1 * | 5/2013 | Beffa et al. | 367/50 |

OTHER PUBLICATIONS

UK Search Report (GB1108222.9), dated Sep. 8, 2011.

* cited by examiner

*Primary Examiner* — Mark Hellner
(74) *Attorney, Agent, or Firm* — Bracewell & Giuliani LLP (57) ABSTRACT

A system and method measures the time offsets of a plurality of acoustic sensor nodes relative to a reference time. The system includes an acoustic transceiver arranged to transmit a first signal to each acoustic sensor node and a processing resource arranged to record the transmission time of the first signal relative to the reference time. The acoustic sensor nodes receive the first signal and transmit a return second signal to the acoustic transceiver after a predetermined time delay, the second signal including the current acoustic sensor node internal time. The acoustic transceiver receives the second signal, and the processing resource records the time at which the second signal was received relative to the reference time and records also the combined time of flight of the first and second signal. From this data the time offset between the sensor node internal time and the reference time is calculated.

20 Claims, 5 Drawing Sheets

SYSTEM FOR MEASURING A TIME OFFSET AND METHOD OF MEASURING A TIME OFFSET

This application claims priority to and benefit of co-pending U.K. Application No. 1108222.9, filed May 17, 2011, entitled "System for Measuring a Time Offset and Method of Measuring a Time Offset" to Sonardyne International, Ltd., which application is hereby incorporated in its entirety herein by reference.

FIELD OF THE INVENTION

This invention relates to a system for measuring a time offset of the type, for example, comprising a plurality of acoustic sensor nodes, such as subsea sensor nodes. This invention also relates to a method of measuring an offset, the method being of the type that, for example, comprises interrogation of the acoustic sensor node.

BACKGROUND OF THE INVENTION

In the field of seismic surveying, it is known to conduct repeatedly the same seismic survey several times over a number of years in order to monitor changes to the structure of a reservoir containing hydrocarbons and to identify deformation of the reservoir as a result of hydrocarbon extraction. Such surveys are commonly referred to as time-lapse seismic surveys. One current process for performing time-lapse seismic surveys is simply to undertake several so-called Ocean Bottom Seismic (OBS) node surveys, separated in time in order to find changes between seismic "pictures" generated from data acquired using the OBS surveys.

The trend in OBS data acquisition is towards deploying a large array of sensor nodes on the seabed that operate entirely autonomously, i.e. they are not linked by cable. The sensor nodes are arranged to record four-component seismic signals, by using one hydrophone and three orthogonal geophone sensors, for the duration of the deployment. Typically, these sensor nodes record data at a sampling rate of around 200 to 400 Hz.

In an example of a known deployment, the sensor nodes are placed on the seabed by Remote Operated Vehicles (ROVs), usually in the order of 1000 nodes at any one time. Typically, the sensor nodes are placed in two-dimensional arrays or "patches", sometimes in a regular arrangement such as a square or a rectangle, and sometimes in more irregular arrangements, and are normally spaced around 400 m to 500 m apart. Once an array of sensor nodes has been deployed, a vessel adapted to perform active seismic transmissions passes over the top of the array many times and discharges a seismic gun repeatedly at around 50 m intervals. The sensor nodes record the resulting seismic data using their hydrophone and geophone sensors to receive the seismic waves generated by the seismic gun and the seismic waves reflected by the various layers of geological structure below the seabed.

The sensor nodes are then recovered by the ROV or a surface vessel and the data downloaded from each sensor node for post-processing.

For effective processing of seismic data, the ability to ensure that sampling instants of every sensor node within the sensor array are "aligned" to a common time frame to a high accuracy, for example approximately ±1 millisecond (ms), is a fundamental requirement so that seismic data between all nodes can be correlated. If time synchronisation is not achieved to this accuracy, the resulting seismic images generated can be degraded and hence inaccurate. In this respect, although measurements are made at the same time, the time noted by each sensor node as to when the measurements were made will not be aligned and so when the seismic images are reproduced by combination of the data collected by each individual sensor node, the misalignment of the measurement times between the sensor nodes will result in distortion of the image.

To this end, time synchronisation within each sensor node is therefore typically achieved with the use of a highly accurate timing module such as an Oven Controlled Crystal Oscillator (OCXO) timing module. Such modules are susceptible to time drift, but can typically keep track of times at which samples are taken ("sample times") to within an accuracy of a few tens of a millisecond over a 2 to 3 month deployment period before any time drift corrections need to be applied. Each OCXO module is equipped with a battery, typically a rechargeable Lithium Ion (Li-Ion) battery.

Before deployment, the time offset of each sensor node is estimated relative to Coordinated Universal Time (UTC) (or an alternative common time base) using an externally originating Global Navigation Satellite System (GNSS) signal, such as GPS signal, which is provided via a cable connection to each and every sensor node prior to subsea deployment. Thereafter, the sensor nodes are "free running" and therefore subject to timing drift until recovered by the surface vessel or the ROV and again provided with the GNSS signal to measure any final time drifts or offsets.

By measuring the initial and final time offsets with respect to the common time base of each sensor node, analysis of any residual drift of the OCXO timing modules can be performed and corrected, thereby providing a final accuracy of approximately ±1 ms for each sensor node as required for seismic processing.

Having characterised the drift of each OCXO timing module, it is then possible to derive the individual sampling instants of each sensor node and therefore time align the recorded seismic data of all sensor nodes within the entire array as required for seismic post-processing.

However, current nodal OBS systems suffer from a number of drawbacks that restrict the ability to perform seismic surveys accurately. Firstly, the OCXO timing module draws significant power from the battery. This power consumption accounts for a significant portion of the overall power demand of the sensor nodes and therefore typically restricts maximum deployment time to around 2 to 3 months as mentioned above. Secondly, and in any event, the OCXO module component of the sensor node can only maintain synchronisation for 2 to 3 months to the required accuracy of ±1 ms, even after pre-deployment and post-recovery drift measurement and correction has been performed. Therefore, after this time the sensor nodes must be recovered and re-synchronised before they can be used again. Thirdly, in order to maintain time synchronisation, the OCXO timing module must be powered continuously between measurement of initial and final time offsets, otherwise synchronisation is irrevocably lost. Consequently, the sensor node cannot be powered down between seismic measurement events in order to conserve charge of the battery.

The effects of this relatively short-term endurance of the sensor nodes are compounded when there are delays in the deployment or recovery of the sensor nodes and sessions of discharge of the seismic gun, for example: lack of availability of the surface vessel, equipment failure and/or bad weather conditions. Once the life of a sensor node has expired, either due to timing drift and/or depletion of the charge of the battery, the sensor node must be recovered for battery charging and OCXO clock drift measurement, which is a very time consuming and costly exercise.

SUMMARY

According to a first aspect of the present invention, there is provided a system for measuring a time offset of an acoustic sensor node relative to a reference time, the system comprising: an acoustic communications unit arranged to transmit a first acoustic probe signal to the acoustic sensor node; a processing resource operably coupled to the acoustic communications unit and arranged to record a transmission time of the first signal, the transmission time being relative to the reference time; wherein the acoustic sensor node is arranged to receive the first signal and to transmit a second acoustic reply signal to the acoustic communications unit after a predetermined time delay, the second signal including time data indicative of a current internal time of the acoustic sensor node during the predetermined time delay; and the acoustic communications unit is arranged to receive the second signal, the processing resource recording a receive time at which the second signal is received, the receive time also being relative to the reference time, and to calculate the combined time of flight of the first and second signals, and using the combined time of flight and the predetermined time delay to calculate the time offset between the current internal time of the sensor node and the reference time.

The acoustic communications unit may be an acoustic transceiver.

The acoustic sensor node may typically be disposed on the seabed and/or in the sea. The acoustic communications unit may be coupled to or integrally formed with a surface vessel, such as a ship or boat. However, the processing resource can be distributed, for example part of the processing resource can be located in the vessel and another part of the processing resource can be located elsewhere, for example at a land-based facility or another sea-based facility.

The surface vessel may be arranged to traverse a sea surface; the acoustic communications unit may be immersed, when in use, in the sea.

The sensor node may be arranged to record seismic sample data. However, as well as being used for seismic surveys, the system and accompanying method set forth herein may be used with other sensor nodes deployed for alternative reasons, for example when deployed in the sea or on the seabed, where precise time alignment is required.

Any accurate reference time may be used with the system and method set forth herein, but the standard, both in terms of practicality and accuracy is UTC, though alternatively International Atomic Time (TAI) may also be used as the reference time.

The internal time of the acoustic sensor node may be represented as a time value, for example a timestamp, such as in the form Hour:Minute:Seconds:Milliseconds:Microseconds or alternatively, and where applicable, as a count of the number of recorded seismic samples taken since the start of a seismic survey and/or since the sensor node last started recording seismic samples.

It may be necessary to characterise relative movement between the acoustic communications unit and the sensor node in order to understand the time of flight differences between the first and second signals. The system may therefore further comprise a motion compensation unit arranged to compensate, when in use, for differences in the time of flight between the first signal and the second signal. The system may further comprise a location determination system; wherein the motion compensation unit may be arranged to use the location determination system in order to determine a time compensation value associated with vessel movement during measurement for application to the time offset. The system may comprise a vessel comprising the acoustic communications unit. The vessel motion compensation unit may be arranged to estimate a first location of the vessel, a second location of the vessel and a location of the sensor node.

The processing resource may be arranged to calculate a first speed of the first signal with respect to a first vector between a vessel at a first location and the sensor node, a second speed of the second signal with respect to a second vector between the sensor node and the vessel at a second location. The first and second speeds may be calculated using a time dilation technique.

One example of the motion compensation unit may be supported by a location determination system; the motion compensation unit may be operably coupled to the acoustic communications unit. In this respect, the surface vessel may be fitted with a GNSS location determination system and an Attitude and Heading Reference System (AHRS) in order to implement the navigation system and/or location determination system and associated methodology. If desired, the navigation system can be implemented as an Inertial Navigation System (INS) and supported by the GNSS.

Measurement of acoustic Doppler shift with respect to the transmitted first and second signals may be used to characterise the relative movement between the acoustic communications unit and the sensor node. In this respect, the processing resource may be arranged to measure the Doppler shift in respect of the first and second signals in order to calculate a difference in times of flight between the first signal and the second signal.

Using any of the above ways of correcting for relative movement of the acoustic communications unit and the sensor nodes, alone or in combination, it is possible to measure the offset between the internal time of the nodes and the reference time. The acoustic communications unit may be arranged to transmit a timing correction instruction to the acoustic sensor node after calculation of the time offset; the sensor node may be arranged to use the time offset in order to update the internal time of the sensor node to the reference time.

According to a second aspect of the invention, there is provided a subsea seismic survey system comprising: a plurality of acoustic seismic sensor nodes; a surface vessel; wherein the surface vessel comprises the acoustic communications unit and the processing resource of the system as set forth above in relation to the first aspect of the invention; and the plurality of acoustic sensor nodes comprises the acoustic sensor node of the system as set forth above in relation to the first aspect of the invention.

According to a third aspect of the present invention, there is also provided a method of measuring a time offset of an acoustic sensor node relative to a reference time, the method comprising: transmitting a first acoustic probe signal to the acoustic sensor node from an acoustic communications unit; recording the transmission time of the first signal, the transmission time being relative to the reference time; the acoustic sensor node receiving the first signal and transmitting a second acoustic reply signal to the acoustic communications unit after a predetermined time delay, the second signal including time data indicative of a current internal time of the acoustic sensor node; and the acoustic communications unit receiving the second signal and recording a receive time at which the second signal is received, the receive time also being relative to the reference time, and calculating the combined time of flight of the first and second signals, and using the combined time of flight and the predetermined time delay to calculate the time offset between the current internal time of the sensor node and the reference time.

The reference time may be Coordinated Universal Time (UTC) or International Atomic Time (TAI).

The internal time of the acoustic sensor node may be represented as a time value or as a count of the number of recorded seismic samples since a start of a seismic survey session.

Seismic samples data may be recorded by the sensor node.

A vessel motion compensation unit may calculate a compensation value for a difference between the time of flight of the first signal and the time of flight of the second signal.

The vessel motion compensation unit may cooperate with a location determination system and may calculate the time compensation value associated with vessel movement during measurement for application to the time offset.

The vessel motion compensation unit may estimate a first location of the vessel, a second location of the vessel and a location of the sensor node.

The method may further comprise: calculating a first speed of the first signal with respect to a first vector between a vessel at a first location and the sensor node; and calculating a second speed of the second signal with respect to a second vector between the sensor node and the vessel at a second location.

The first and second speeds may be calculated using a time dilation technique.

The method may further comprise: transmitting a timing correction instruction to the acoustic sensor node after calculation of the time offset in order to update the internal time of the acoustic node to the reference time.

If desired, time offset measurements can be made between first and second time offset measurements, thereby enabling clock drift to be characterised using a non-linear model, for example a higher-order curve than first order, such as a quadratic curve. The ability to provide more than the first measurement made pre-deployment of the sensor node and the second measurement made post-deployment of the sensor node, following recovery of the sensor node, enables curve-fitting to such models to be accomplished.

Prior to the transmission of the first signal, an activation signal may be sent to the sensor node from the acoustic communications unit to instruct the sensor node to power up or leave a standby state.

After the sensor node has completed participation in a seismic survey, a deactivation signal may be sent to the sensor node from the acoustic communications unit to instruct the sensor node to power down or enter a standby state.

According to a fourth aspect of the invention, there is provided a method of performing a subsea seismic survey, the method comprising: measuring seismic information using a plurality of sensor nodes; and determining the time offset for each sensor node using the method of measuring a time offset as set forth above in relation to the third aspect of the invention.

According to a fifth aspect of the present invention, there is provided a computer program element comprising computer program code means to make a computer execute the method as set forth above in relation to the third aspect and/or the fourth aspect of the invention.

The computer program element may be embodied on a computer readable medium.

It is thus possible to provide a method and system having improved convenience and energy efficiency in relation to an arbitrarily sized array of sensor nodes. The sensor nodes are capable of supporting a standby power state, with no timing module running and no data recording. Prior to the start of the seismic survey, each sensor node can be powered up from the standby state via an acoustic control signal in order to be able to start recording data and then the time offset of each node relative to a reference time, such as UTC, can be measured remotely at a surface vessel.

The sensor nodes therefore operate in 'recording mode' only for the duration of the seismic survey. This may last only a few days. Therefore, overall battery endurance is significantly increased. By measuring time offsets immediately preceding and again after the survey, i.e. before/after the recording period of interest, this characterisation of time offsets can be used to maintain synchronisation accuracy during the recording period of interest in respect of seismic images to be generated. Also, any long term, for example 60 day, time drift has little effect on the seismic images that can be generated. The sensor nodes do not need to be synchronised to a reference time prior to and after each deployment. Consequently, reference time synchronisation and clock drift compensation of a sensor node whilst on a surface platform, which typically takes upwards of 1 hour to complete, due to inter alia the requirement of 2 to 3 months operation at an accuracy of less than ±1 ms time drift, is not required. As a seismic survey normally takes a few days to perform, the method and system enable a lower power, lower accuracy, crystal oscillator to be used than the OCXOs currently used. In this respect, the reduced requirement of maintaining less than ±1 ms time drift for only a few days as opposed to a number of months makes this possible. At sea temperature to which an OCXO timing module is subjected, for example about 2° C., the lower accuracy crystal oscillator also exhibits a very low time drift, i.e. stable frequency control during near constant temperature deployment. Consequently, any time offsets can be characterised 'in situ' as opposed to before and after deployment of the sensor nodes and in deep water. Furthermore, the sensor nodes can remain on the seabed for many months or years without needing repeat visits to the surface to replace the battery or for time synchronisation. The sensor nodes are simply placed in standby mode in between seismic surveys. This reduces deployment time and costs and also provides better time lapse seismic data since the sensor nodes are not physically moved between each survey, as positional repeatability is important for time lapse seismic surveys.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Throughout the following description identical reference numerals will be used to identify like parts.

Figure 1:
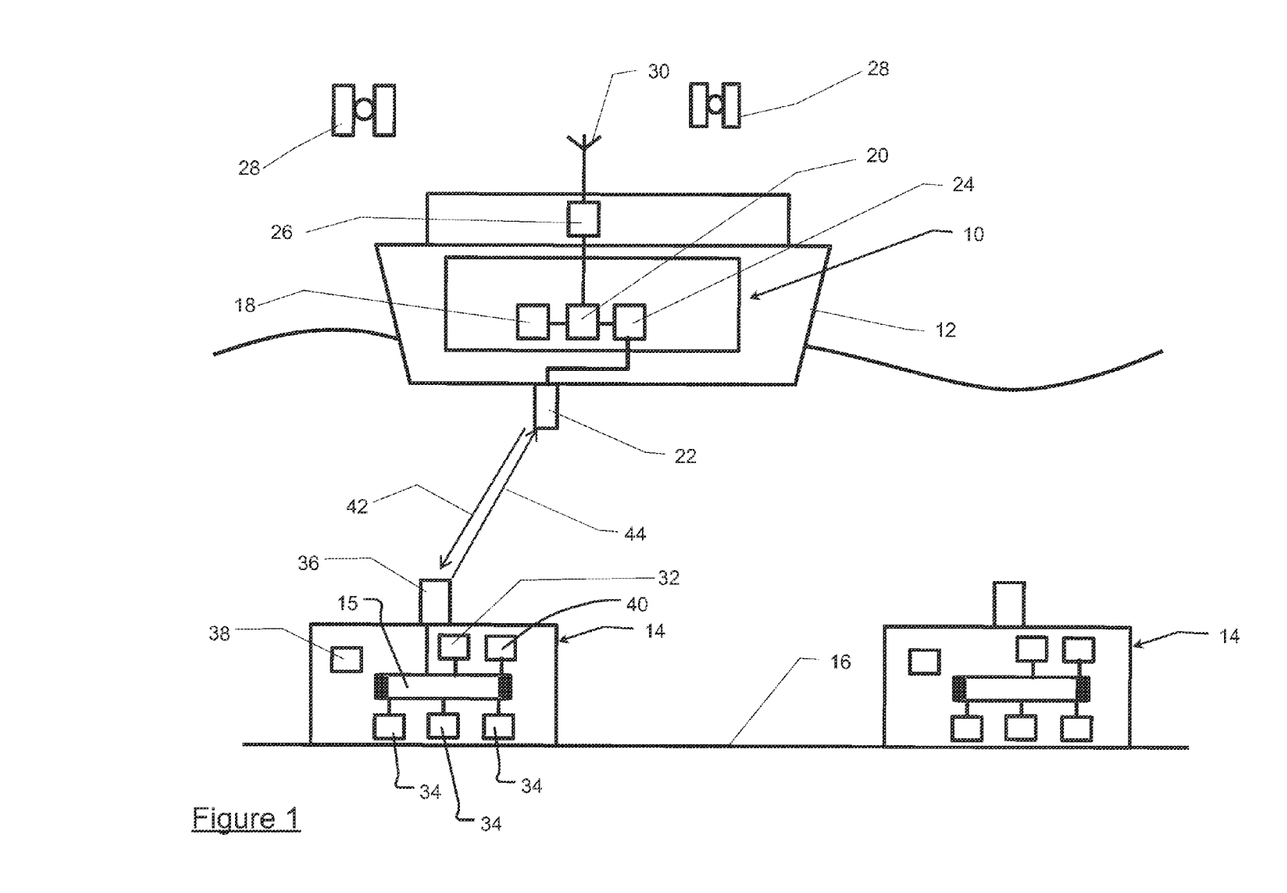
FIG. 1 is a schematic representation of a system for measuring time offsets constituting an embodiment of the invention.

Referring to FIG. 1, in a system for measuring time offsets an acoustic control system 10 is disposed in a surface vessel 12, which can be a ship or boat, the acoustic control system 10 being adapted to send and receive signals between an array of sensor nodes, generally indicated 14, disposed upon the seabed 16. The acoustic control system 10 comprises a processing resource 18, for example a processor, operably coupled to a communications hub 20, the communications hub 20 being coupled to an acoustic transceiver 22 for the purpose of sending and receiving acoustic signals to and from the sensor nodes 14. The acoustic transceiver 22 is attached to or integrally formed with the underside of the hull of the vessel 12 and so is immersed below the sea surface when in use. The acoustic transceiver 22 can be any suitable acoustic transceiver, for example a suitably adapted Fusion USBL transceiver available from Sonardyne International Limited, UK.

In this example, the acoustic transceiver 22 is coupled to the communications hub 20 via a motion compensation unit 24. The processing resource 18 is capable of processing and/or storing data. Although, in this example, the processing resource 18 is "topside" and located in the vessel 12, the processing resource 18 can be distributed, for example part of the processing resource 18 can be located in the vessel 12 and another part of the processing resource 18 can be located elsewhere, for example at a land-based facility or another sea-based facility (not shown).

The communications hub 20 is operably coupled to a GNSS receiver 26, for example a Global Positioning System (GPS) receiver, which receives timing data from one or more GNSS satellites 28 to provide the acoustic control system 10 with a reference time, such as Coordinated Universal Time (UTC). The GNSS receiver 26 is coupled to a GNSS antenna 30, for example a GPS antenna.

In this example, each (subsea) sensor node 14 is deployed on the seabed 16 for conducting time-lapse seismic surveys. Each sensor node 14 is adapted to record four way seismic signals, and usually comprises another processing resource 15, for example another processor, operably coupled to a hydrophone 32 and three orthogonally disposed geophones 34. Each sensor node 14 further comprises an acoustic transceiver 36 operably coupled to the processing resource 15 and arranged to communicate acoustic signals with the acoustic transceiver 22 attached to the vessel 22. A battery 38, such as a Lithium Ion battery, is also provided to power the sensor node 14. A timing module 40, including a crystal oscillator (not shown), is also operably coupled to the processing resource 15. In this example, the crystal oscillator does not require heating in order to maintain a predetermined temperature as is required by an Oven Controlled Crystal Oscillator commonly used for sensor nodes in seismic surveys.

An internal time of each sensor node 14 is recorded by the timing module 40 using the crystal oscillator.

The sensor nodes 14 are deployed on the seabed 16 by remote operated vehicles (not shown), which are capable of deploying, for example, in the order of 1000 sensor nodes 14 during a given deployment session if required. Typically, the sensor nodes 14 are placed in two-dimensional patches or arrays, usually in a regular arrangement such as a square or rectangle, and are normally spaced about 400 m to about 500 m apart. In this example, an array of 16 sensor nodes, for example a 4×4 array, is used. However, it should be appreciated that a greater or fewer number of sensor nodes can be employed depending upon application requirements. The sensor nodes 14 can be switched on and off from the vessel 12 using an acoustic activation signal when a seismic survey is to be undertaken.

Although the precise method of conducting a seismic survey would distract from the core teachings of the embodiments of the invention described herein, for the sake of clarity a brief summary of this method is as follows. As part of the seismic survey, the vessel 12 passes over the top of the array of sensor nodes 14 many times and fires a seismic gun (not shown) repeatedly at around 50 m intervals. The sensor nodes 14 record the resulting seismic data generated by their hydrophone 32 and geophone 34 sensors and the information from these surveys is later collected and processed. However, the timing data used with the seismic survey data collected by each sensor node 14 must be substantially in synchronism otherwise the seismic survey data will be inaccurately processed. Any differences in internal time between each sensor node 14 must be minimised, for example to a margin of less than approximately 1 ms, or substantially eliminated, so that the survey data can be accurately processed. In particular, the offset of the internal time of the sensor node 14 and a reference time must be calculated.

In operation (FIG. 2), an offset in time between the internal time of each sensor node 14 and the reference time is calculated as follows.

Figure 2:
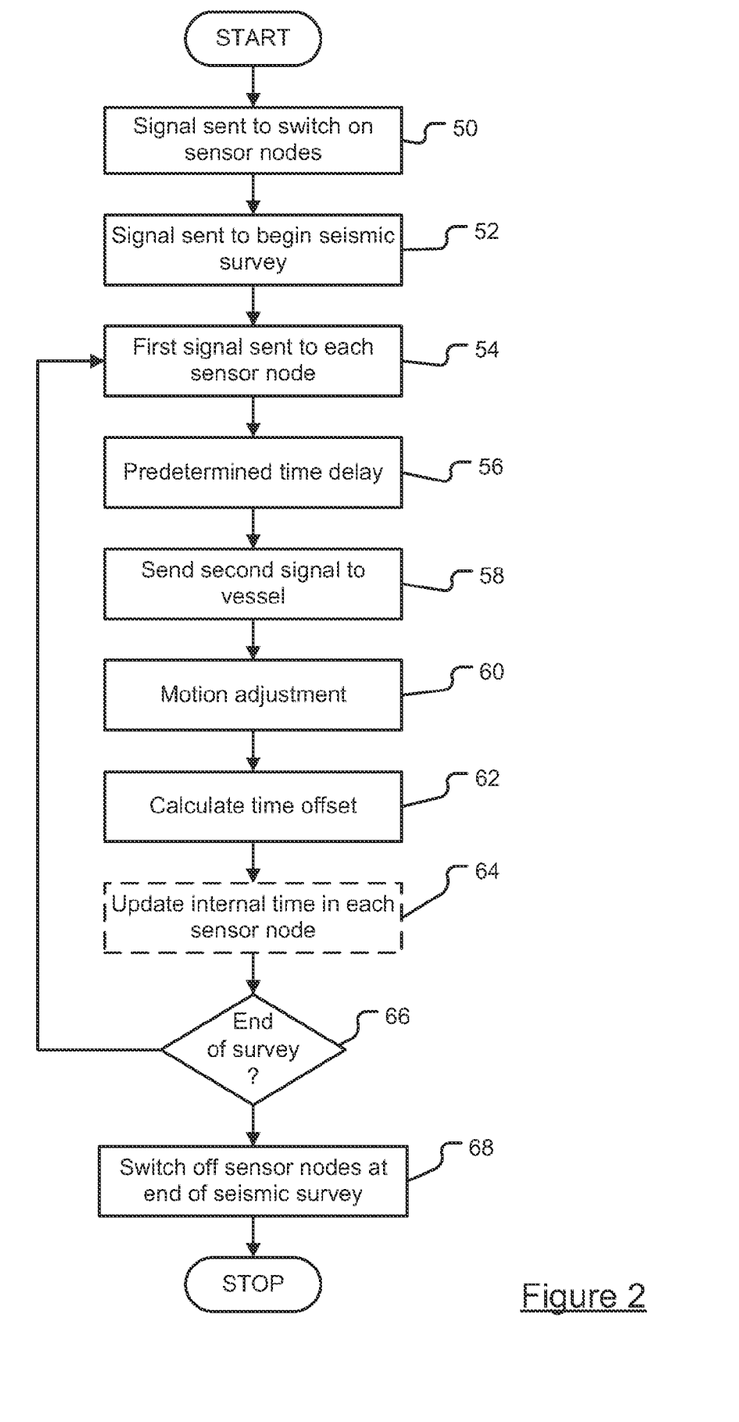
FIG. 2 is a flow diagram of a method of measuring time offsets constituting another embodiment of the present invention.

However, as a preliminary step 50, an acoustic activation signal is firstly sent to each sensor node 14 from the vessel 12 to instruct them to power up hardware relating to recordal, and optionally processing, of seismic data followed by an acoustic control signal at a second preliminary step 52 to signal the beginning of the seismic survey. Thereafter, or after the instruction to the acoustic sensor nodes to power up, the acoustic transceiver 22 on the vessel 12 then sends an acoustic probe signal (Step 54) to the acoustic transceiver 36 of each sensor node 14 (represented by line 42 in FIG. 1) and the time at which the acoustic probe signal 42 is sent relative to a reference time, in this example Coordinated Universal Time (UTC), is recorded by the processing resource 18 at the transmission time of the acoustic probe signal. The acoustic transceiver 36 of each sensor node 14 receives the acoustic probe signal 42 and after a predetermined time delay (Step 56), transmits an acoustic reply signal (represented by line 44 in FIG. 1) back to the acoustic transceiver 22 on the vessel 12 (Step 58). The data incorporated into the acoustic reply signal 44 includes the internal time of the sensor node 14, for example a timestamp, such as a timestamp represented in the following format: hours:minutes:seconds:milliseconds:microseconds. Alternatively, the internal time could be sent as a count of the number of recorded seismic samples since the start of the seismic survey or since the node last started recording seismic samples. The acoustic reply signal 44 also comprises data identifying the sensor node 14.

The acoustic transceiver 22 on the vessel 12 receives the acoustic reply signal 44 and the processing resource 18 records the time at which the second signal 44 was received relative to the reference time, and from that a combined time of flight is calculated.

In a simple embodiment, the vessel 12 is assumed to be stationary when communicating with the acoustic transceiver 36 of a given sensor node 14 and so the send and receive paths are assumed to be equidistant and an outbound time of flight, T, is assumed to be the same as a return time of flight. Consequently, taking into account the predetermined time delay of the sensor node when responding to the acoustic probe signal 42, the round-trip, overall, time of flight is $2T + \Delta t_r$, where $\Delta t_r$ is the predetermined time delay that comprises the delay between the sensor node 14 receiving the acoustic probe signal 42 and transmitting the acoustic reply signal 44. It is therefore further assumed that the local time of the sensor node 14 is to be found at the "mid-point" of the signal propagation path and hence half of the round-trip time of flight after deduction of the predetermined time delay, $\Delta t_r$.

However, the vessel 12 and the sensor nodes 14 do not stay in exactly the same relative position whilst signals are sent and received between the acoustic transceiver 22 of the vessel 12 and the sensor nodes 14, because the vessel 12 is likely to move, for example due to wave movement and water currents, during measurement of the times of flight associated with calculation of the timing offset of the sensor node 14. Consequently, the time of flight between sent and received signals are not identical. In this respect, and referring to FIG. 3, any movement of the vessel 12 introduces an indeterminate difference in the individual path lengths of the sent and received signals between the vessel 12 and the sensor node 14. This, in turn, introduces an error in determining the correspondence between the time in the time frame of the vessel 12 and the measurement of this time in the context of the time frame of the sensor node 14.

Figure 3:
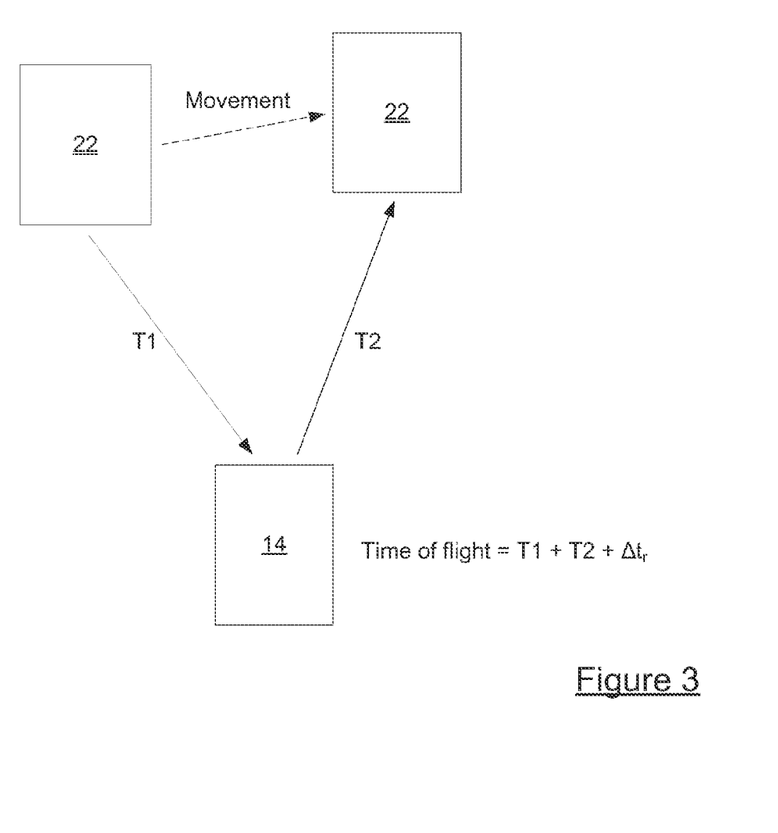
FIG. 3 is a schematic diagram of acoustic signal paths between a surface vessel and a sensor node of FIG. 1.

For example, an uncompensated relative movement of 1.5 metres between the sensor node 14 and the acoustic transceiver 22 between the sending of the first signal and reception of the second signal introduces an error of ±1 ms to the absolute time offset measurement, which is the very limit of acceptable time inaccuracy for seismic sensor node systems. If operating the acoustic sensor nodes 14 in 1000 meters water depth, the combined time of flight, including the predetermined delay in the sensor node 14, would be around 1.5 seconds. The acoustic transceiver could easily move considerably more than 1.5 metres in this time especially if high sea states are present.

As intimated above, the overall, round-trip, time of flight is therefore the sum of a first time of flight, $T_1$, associated with transmission of the acoustic probe signal 42 from the vessel 12 to the sensor node 14, a second time of flight, $T_2$, associated with the transmission of the acoustic probe signal 44 from the sensor node 14 to the vessel 12, and the predetermined time delay, $\Delta t_r$.

The motion compensation unit 24 is therefore used to compensate for relative movement of the vessel 12 with respect to the sensor nodes 14 (Step 60). By knowing the respective times of flight of the acoustic probe signal 42 and the acoustic reply signal 44 signal, and the length of the predetermined time delay, $\Delta t_r$, after applying a correction calculated by the motion compensation unit 24, the internal time of each sensor node 14 can be compared to the UTC reference time, and thus the offset time for each sensor node 14 can be calculated (Step 62) by the processing resource 18.

Figure 4:
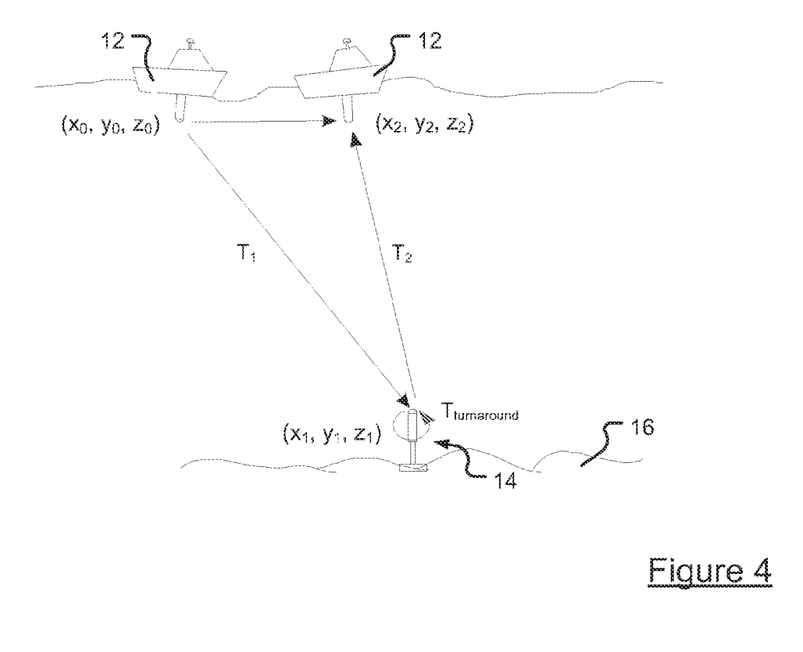
FIG. 4 is a schematic diagram of acoustic signal paths between a surface vessel and a sensor node and associated variables for employing an INS-based movement compensation technique.

In a first example implementation, the motion compensation unit 24 is supported by a navigation system capable of determining a location, for example the GNSS, of the vessel 12, the motion compensation unit 24 being operably coupled to the acoustic transceiver 22. The motion compensation unit 24 is able to measure movement of the vessel 12 in x, y and z coordinates during a time of flight measurement and so can be used to maintain accurate time offset measurements. To support the navigation system, the motion compensation unit 24 can comprise an Attitude and Heading Reference System (AHRS) in addition to use of the GNSS. If desired, the navigation system can alternatively be implemented as an Inertial Navigation System (INS) supported by the GNSS. The x, y and z translation coordinates of the vessel 12 between the GNSS antenna 30 and the acoustic transceiver 22, known as the lever arm between the antenna 30 and the transceiver 22, are measured using the AHRS. By this means the position of the acoustic transceiver 22 in the "GNSS" frame is estimated at the instant the acoustic probe signal 42 is sent and the instant the acoustic reply signal 44 is received. The position of each sensor node 14 in the same frame is known and therefore the error due to vessel motion can be mitigated.

In this respect, if one considers the vessel 12 moving across the surface of the sea relative to the sensor node 14, the sensor node 14 is stationary and located at a point in space estimated as having coordinates: $x_1, y_1, z_1$. At a point in space estimated as having coordinates, $x_0, y_0, z_0$, the vessel 12 transmits the acoustic probe signal 42 at an initial time, $t_0$, with respect to the time frame of the vessel 12. The estimated coordinates of the vessel and the initial time are logged by the motion compensation unit 24 (or any other suitable entity supported, for example, by the processing resource 18). The acoustic probe signal 42 is received by the sensor node 14 after a first time, $T_1$. An estimate of the first time, $T_1$, is derived using the coordinates of the vessel 12, $x_0, y_0, z_0$, the estimated coordinates of the sensor node 14, $x_1, y_1, z_1$, and a sound speed. In this regard, any sound speed can be used including "1". A time calculation unit (not shown) is supported by the processing resource 15 and the timing module 40 of the sensor node 14 notes a time of arrival, $ts_0$, of the acoustic probe signal 42 with respect to the time frame used locally by the timing module 40 of the sensor node 14.

After elapse of an accurate "turnaround time", $T_{turnaround}$, the sensor node 14 replies by transmitting the acoustic reply signal 44 comprising the time of arrival, $ts_0$, at the sensor node 14 as generated by the sensor node 14 and, in this example, data identifying the sensor node 14.

As the vessel 12 is moving, the acoustic reply signal 44 transmitted by the sensor node 14 is received by the vessel 12 when at new coordinates: $x_2, y_2, z_2$. The motion compensation unit 24 logs the time of arrival, $ts_1$, of the acoustic reply signal 44 transmitted by the sensor node 14, the subsequent time of arrival being recorded with respect to the time frame of the vessel 12, along with the estimated coordinates of the vessel 12, $x_2, y_2, z_2$, and the time of arrival, $ts_0$, recorded by the sensor node 14 with respect to the time frame of the timing module 40 of the sensor node 14. The second travel time, $T_2$, is estimated using the estimated coordinates of the sensor node 14, the new location of the vessel 12 ($x_1, y_1, z_1$ and $x_2, y_2, z_2$) and the sound speed used to estimate the first travel time, $T_1$. The coordinates of the sensor node 14 can be estimated in a number of ways. For example, the coordinate can be estimated using a so-called Long BaseLine (LBL) "box-in" technique, which uses a combination of position estimates of one or more vessels along with time of flight measurements to the sensor node 14 in order to estimate the coordinates of the sensor node 14. Alternatively, the coordinates of the sensor node 14 can be estimated by relying on an Ultra-Short BaseLine (USBL) system of the vessel 12 in combination with GNSS data generated by the GNSS of the vessel 12. The locations of a given sensor node can be estimated at the time of deployment of the sensor node or the location can be estimated using data collected as the vessel 12 passes over and between the sensor nodes 14 during a seismic survey. The skilled person should appreciate, however, that any suitable combination of these techniques can be employed.

From the perspective of the vessel 12, the measured round trip time, $t_{mrt}$, is given by:

$$t_{mrt} = T_{1m} + T_{2m} + T_{turnaround} \qquad (1)$$

where $T_{1m}$ is the measured first travel time and $T_{2m}$ is the measured second travel time.

A best estimate for the measured first travel time $T_{1m}$ can be derived, using the following assumption of a ratio equivalence:

$$\frac{T_1}{T_2} = \frac{T_{1m}}{T_{2m}} = k_1 \qquad (2)$$

Rearranging equation (2):

$$T_{2m} = \frac{T_{1m}}{k_1} \qquad (3)$$

Rearranging equation (1):

$$T_{1m} + T_{2m} = t_{mrt} - T_{turnaround} = k_2 \qquad (4)$$

Substituting equation (3) into equation (4):

$$T_{1m} + \frac{T_{1m}}{k_1} = k_2 \qquad (5)$$

Multiplying through equation (5) by $k_1$ and rearranging, an expression for the measured second travel time, $T_{1m}$:

$$T_{1m} = \frac{k_1 \times k_2}{1 + k_1} \qquad (6)$$

Using the convention that offset or error is the observed value minus the true value, the error in the clock, $T_e$, of the sensor node 14, with respect to the frame of the vessel 12 is $ts_0 - (t_0 + T_{1m})$, where $t_0$ is the time at which the vessel transmits the acoustic probe signal 42. The error calculated can be subtracted from any time communicated to the vessel 12 from the sensor node 14 in order to correct the time of arrival received to time in the context of the vessel time frame. The corrected time data can subsequently be used for the purpose of processing seismic data. When performing a subsea seismic survey, seismic information can be measured using the plurality of the sensor nodes, and the time offset for each sensor node can be determined using the above technique in order to facilitate processing of the measured seismic information. In this respect, correction for time drift can be achieved by re-sampling a recorded complete data set according to an appropriate drift model to which the data recorded is fitted, for example a non-linear drift model. Once the time drift has been characterised, a suitable re-sampling process can be implemented to obtain data samples at the required sampling interval, for example a so-called "piecewise polynomial process" for temporal re-sampling of data, or any other suitable technique. The resulting re-sampled data is in respect of the required sampling interval, for example 2 ms, 4 ms or 6 ms, as required by seismic data analysts for performance of seismic processing, i.e. data sampled at points in time that do not conform to the desired sampling intervals, for example 1.9999 ms or 2.00001 ms, result in erroneous seismic processing of the data set.

If desired, the acoustic transceiver 22 can be combined with an INS and AHRS, an example of which is the Lodestar GyroUSBL, available from Sonardyne International Limited, UK, in order to support the above technique.

A second example implementation (FIG. 5) of the motion compensation unit 24 measures the acoustic Doppler shift or time dilation/compression of transmitted and received signals and this, in turn, provides a measure of so-called "observed velocity" of the acoustic transceiver 22, i.e. the vector of movement as observed in a two way time of flight measurement.

Figure 5:
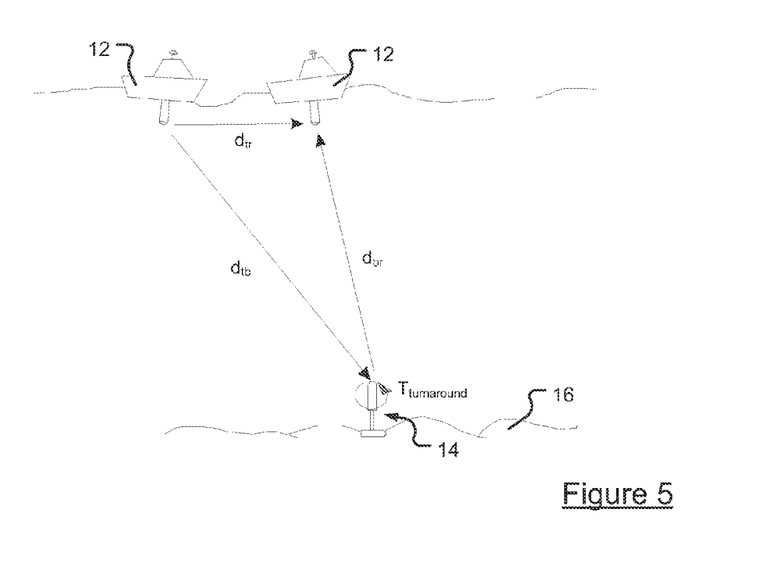
FIG. 5 is a schematic diagram of acoustic signal paths between a surface vessel and a sensor node and associated variables for employing a time dilation/contraction-based movement compensation technique.

In this respect, again the vessel 12 moves across the surface of the sea relative to the sensor node 14, the sensor node 14 being stationary and located at a point in space on the seabed 16. At a time $t_0$, with respect to the time frame of the vessel 12, the vessel 12 transmits the acoustic probe signal 42 comprising transmission time data. This data is logged in the motion compensation unit 24 of the vessel 12. After elapse of a propagation time, the acoustic probe signal 42 is received by the sensor node 14. As will be explained in further detail herein, the time calculation unit of the sensor node 14 estimates and records the speed of the acoustic probe signal 42 along a vector from the vessel 12 to the sensor node 14, and also notes the time of arrival, $ts_0$, in the context of the local time frame of the sensor node 14. After elapse of an accurate "turnaround time", $T_{turnaround}$, the sensor node 14 replies by transmitting the acoustic reply signal 44 comprising the time of arrival, $ts_0$, at the sensor node 14 as generated by the sensor node 14, as well as the speed of the acoustic probe signal 42 along the vector from the vessel 12 to the sensor node 14, and data identifying the sensor node 14.

The acoustic reply signal 44 transmitted by the sensor node 14 is received by the vessel 12. The motion compensation unit 24 of the vessel 12 logs the identity of the sensor node 14 and the time of arrival, $ts_1$, of the acoustic reply signal 44 transmitted by the sensor node 14, the subsequent time of arrival being recorded with respect to the time frame of the vessel 12. The motion compensation unit 24 also extracts the time of arrival, $ts_0$, and the estimated speed of the acoustic probe signal 42 along the vector from the vessel 12 to the sensor node 14.

Figure 6:
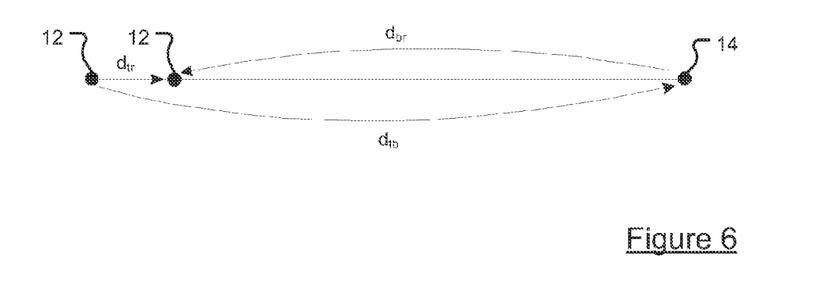

Due to the speed estimates for the acoustic probe signal 42 being calculated along the vector from the vessel 12 to sensor node 14, the calculation of the round-trip time from the vessel 12 to the sensor node 14 and back to the vessel 12 can be considered in one dimension with little loss of precision, for example as can be seen from FIG. 6.

In such an implementation, the recorded time (in the time frame of the vessel 12) between transmission and reception is $T_R$. At the time of transmission, the one-dimensional vector (distance) between the vessel 12 and the sensor node 14 is $d_{TB}$, and the one-dimensional vector (distance) between the sensor node 14 and the vessel 12 (at the time of reception) is $d_{BR}$. Also, between the transmission and reception times, the vessel 12 travels along the one-dimensional vector (distance) $d_{TR}$. The speed of sound in water is assumed to be c and the known turnaround time of the beacon is $T_{turnaround}$.

As speed=distance/time, it therefore follows that the round-trip time, $T_R$, is found from the following expression:

$$T_R = \frac{d_{TB}}{c} + \frac{d_{BR}}{c} + T_{turnaround} \qquad (7)$$

Rearranging the above expression yields:

$$\frac{d_{TB} + d_{BR}}{c} = T_R - T_{turnaround} \qquad (8)$$

An observation variable, $O_1$, can be assigned to the right hand side of this equation. Furthermore, the observation variable $O_1$ can be calculated from the measured round-trip time, $T_R$, and the known turnaround time $T_{turnaround}$. Rearranging this expression further, we get:

$$d_{TB}+d_{BR}=c*O_1 \quad (9)$$

This provides a first equation of a pair of simultaneous equations. To derive the second equation, the vector $d_{TR}$ needs to be considered. In this respect, at transmission time, the speed of the transmitted signal along the vessel-to-sensor node vector is $S_{TB}$, and at reception time, the speed along the sensor node-to-vessel vector is $S_{BR}$. Using the speed variables, an expression for the distance travelled by the vessel 12 can be derived.

$$d_{TR} = \left(\frac{S_{TB} + S_{BR}}{2}\right) * T_R \quad (10)$$

In the above expression, the speeds are calculated using a time dilation/compression technique known in the art, for example the so-called ambiguity function method or the block Doppler estimation method as described in "A computationally efficient Doppler compensation system for underwater acoustic communications" (Sharif et al., IEEE Journal of Oceanic Engineering, January 2000, Vol. 25 No. 1, pages 52 to 61), and then the summed speeds are averaged. Of course, the skilled person will appreciate that the time dilation may be negative, namely an equivalence exists between time compression and time dilation.

An observation variable $O_2$ is then assigned to represent this calculated quantity. The equivalence, speed=distance/time, is also used so that the above expression can be rewritten in terms of the distance vectors $d_{TB}$ and $d_{BR}$:

$$\frac{d_{TB} - d_{BR}}{c} = O_2 \quad (11)$$

After rearranging this equation, the second of the pair of simultaneous equations is obtained:

$$d_{TB}-d_{BR}=c*O_2 \quad (12)$$

As mentioned above, the speed of sound in water is assumed to be c, and so by adding equations (9) and (12), we can obtain an estimate for $d_{TB}/c$, which is equivalent to $T_{1m}$ used in the navigation system method previously described. Using the convention that offset or error is the observed value minus the true value, the error in the clock, $T_e$, of the sensor node 14, with respect to the frame of the vessel 12 is $ts_0-(t_0+d_{TB}/c)$, where $t_0$ is the time at which the vessel transmits the acoustic probe signal 42. The error calculated can be subtracted from any time communicated to the vessel 12 from the sensor node 14 in order to correct the time of arrival received to time in the context of the vessel time frame. The corrected time data can subsequently be used for the purpose of processing seismic data. When performing a subsea seismic survey, seismic information can be measured using the plurality of the sensor nodes, and the time offset for each sensor node can be determined using the above technique in order to facilitate processing of the measured seismic information. In this respect, correction for time drift can be achieved by re-sampling a recorded complete data set according to an appropriate drift model to which the data recorded is fitted, for example a non-linear drift model. Once the time drift has been characterised, a suitable re-sampling process can be implemented to obtain data samples at the required sampling interval, for example a so-called "piecewise polynomial process" for temporal re-sampling of data, or any other suitable technique. The resulting re-sampled data is in respect of the required sampling interval, for example 2 ms, 4 ms or 6 ms, as required by seismic data analysts for performance of seismic processing, i.e. data sampled at points in time that do not conform to the desired sampling intervals, for example 1.9999 ms or 2.00001 ms, result in erroneous seismic processing of the data set.

Although this technique results in the accuracy of the calculation of the speed of the vessel along the vector from the vessel 12 to the sensor node 14 becoming contaminated by heave experienced by the vessel 12, the inaccuracy in the speed calculated can be mitigated by making many observations.

Once compensation has been applied, in an optional further step (Step 64), respective correction signals can be sent from the acoustic transceiver 22 of the vessel 12 to the acoustic transceiver 36 in each sensor node 14, the correction signal containing the offset time data. The offset time data can be used by the sensor nodes 14 in order to update the internal time of each sensor node 14.

The process can then be repeated (Steps 54 to 64) at the end of the seismic survey (Step 66) to allow for any time drift that has occurred since the surveys began. Thereafter, an acoustic deactivation signal is sent (Step 68) from the vessel 12 to the sensor node 14 in order to power down the sensor nodes 14 or place them in a standby state.

Time offset measurement can also be repeated a number of times during the survey as necessary/when opportune in order to improve the statistical confidence in the seismic measurements.

Throughout the above description, reference has been made to the communication of signals to the vessel and mathematical expressions have been recited in respect of communications to and/or from the vessel as opposed to with respect to the acoustic transceiver 22. The skilled person should appreciate though that, where appropriate and/or desirable, the calculations of location can be with respect to the location of the acoustic transceiver 22.

What is claimed is:

1. A system for measuring a time offset of an acoustic sensor node relative to a reference time, the system comprising:
   an acoustic communications unit arranged to transmit a first acoustic probe signal to the acoustic sensor node;
   a processing resource operably coupled to the acoustic communications unit and arranged to record a transmission time of the first signal, the transmission time being relative to the reference time; wherein
   the acoustic sensor node is arranged to receive the first signal and to transmit a second acoustic reply signal to the acoustic communications unit after a predetermined time delay, the second signal including time data indicative of a current internal time of the acoustic sensor node during the predetermined time delay; and
   the acoustic communications unit is arranged to receive the second signal, the processing resource recording a receive time at which the second signal is received, the receive time also being relative to the reference time, and to calculate the combined time of flight of the first and second signals, and using the combined time of flight and the predetermined time delay to calculate the time offset between the current internal time of the sensor node and the reference time.

2. The system according to claim 1, wherein the acoustic sensor node is arranged on the seabed and/or in the sea.

3. The system according to claim 1, wherein the acoustic communications unit is coupled to or integrally formed with a surface vessel.

4. The system according to claim 1, wherein the sensor node is arranged to record seismic sample data.

5. The system according to claim 1, further comprising:
a vessel motion compensation unit arranged to compensate, when in use, for differences in the time of flight between the first signal and the second signal.

6. The system according to claim 5, further comprising:
a location determination system; wherein
the vessel motion compensation unit is arranged to use the location determination system in order to determine a time compensation value associated with vessel movement during measurement for application to the time offset.

7. The system according to claim 5, wherein the processing resource is arranged to calculate a first speed of the first signal with respect to a first vector between a vessel at a first location and the sensor node, a second speed of the second signal with respect to a second vector between the sensor node and the vessel at a second location.

8. The system according to claim 5, wherein the motion compensation unit is arranged to cooperate with a GNSS location determination system and an Attitude and Heading Reference System.

9. The system according to claim 1, wherein the acoustic communications unit is arranged to transmit a timing correction instruction to the acoustic sensor node after calculation of the time offset, the sensor node being arranged to use the time offset in order to update the internal time thereof to the reference time.

10. A subsea seismic survey system comprising:
a plurality of acoustic seismic sensor nodes;
a surface vessel; wherein
the surface vessel comprises an acoustic communications unit arranged to transmit a first acoustic probe signal to the plurality of acoustic sensor nodes and a processing resource operably coupled to the acoustic communications unit and arranged to record a transmission time of the first signal, the transmission time being relative to the reference time;
the plurality of acoustic sensor nodes are arranged to receive the first signal and to transmit a second acoustic reply signal to the acoustic communications unit after a predetermined time delay, the second signal including time data indicative of a current internal time of the acoustic sensor node during the predetermined time delay; and
the acoustic communications unit is arranged to receive the second signal, the processing resource recording a receive time at which the second signal is received, the receive time also being relative to the reference time, and to calculate the combined time of flight of the first and second signals, and using the combined time of flight and the predetermined time delay to calculate the time offset between the current internal time of the sensor node and the reference time.

11. A method of measuring a time offset of an acoustic sensor node relative to a reference time, the method comprising:

transmitting a first acoustic probe signal to the acoustic sensor node from an acoustic communications unit;
recording a transmission time of the first signal, the transmission time being relative to the reference time;
the acoustic sensor node receiving the first signal and transmitting a second acoustic reply signal to the acoustic communications unit after a predetermined time delay, the second signal including time data indicative of a current internal time of the acoustic sensor node; and
the acoustic communications unit receiving the second signal and recording a receive time at which the second signal is received, the receive time also being relative to the reference time, and calculating the combined time of flight of the first and second signals, and using the combined time of flight and the predetermined time delay to calculate the time offset between the current internal time of the sensor node and the reference time.

12. The method according to claim 11, wherein the internal time of the acoustic sensor node is represented as a time value or as a count of the number of recorded seismic samples since a start of a seismic survey session.

13. The method according to claim 11, wherein seismic samples data is recorded by the sensor node.

14. The method according to claim 11, wherein a vessel motion compensation unit calculates a compensation value for a difference between the time of flight of the first signal and the time of flight of the second signal.

15. The method according to claim 14, wherein the vessel motion compensation unit cooperates with a location determination system and calculates the time compensation value associated with vessel movement during measurement for application to the time offset.

16. The method according to claim 14, further comprising:
calculating a first speed of the first signal with respect to a first vector between a vessel at a first location and the sensor node; and
calculating a second speed of the second signal with respect to a second vector between the sensor node and the vessel at a second location.

17. The method according to claim 11, further comprising:
transmitting a timing correction instruction to the acoustic sensor node after calculation of the time offset in order to update the internal time of the acoustic node to the reference time.

18. The method according to claim 11, wherein prior to the transmission of the first signal, an activation signal is sent to the sensor node from the acoustic communications unit to instruct the sensor node to power up or leave a standby state.

19. The method according to claim 11, wherein after the sensor node has completed participation in a seismic survey, a deactivation signal is sent to the sensor node from the acoustic communications unit to instruct the sensor node to power down or enter a standby state.

20. The method of performing a subsea seismic survey, the method comprising:
measuring seismic information using a plurality of sensor nodes; and
determining the time offset for each sensor node using the method of measuring a time offset according to claim 11.

* * * * *